United States Patent [19]

Chaloner-Gill

[11] Patent Number: 5,580,682
[45] Date of Patent: Dec. 3, 1996

[54] SOLID ELECTROLYTES, CONTAINING OXYALKYLENE SOLVENTS AND/OR OXYALKLENE POLYMERS AND ELECTROLYTIC CELLS PRODUCED THEREFROM

[76] Inventor: Benjamin Chaloner-Gill, 520 Mansion Ct., #303, Santa Clara, Calif. 95054

[21] Appl. No.: 514,716

[22] Filed: Aug. 14, 1995

Related U.S. Application Data

[63] Continuation of Ser. No. 136,437, Oct. 13, 1993, abandoned.
[51] Int. Cl.$^6$ .................................................. H01M 10/40
[52] U.S. Cl. ........................................ 429/192; 252/62.2
[58] Field of Search ............................ 429/192; 252/62.2

[56] References Cited

U.S. PATENT DOCUMENTS

| | | | |
|---|---|---|---|
| 5,001,023 | 3/1991 | Cheshire et al. | 429/192 X |
| 5,102,751 | 4/1992 | Narang et al. | 429/192 |
| 5,110,694 | 5/1992 | Nagasubramanian et al. | 429/192 |
| 5,219,679 | 6/1993 | Abraham et al. | 429/192 |

FOREIGN PATENT DOCUMENTS 332775  9/1989  European Pat. Off. .

*Primary Examiner*—Stephen Kalafut
*Attorney, Agent, or Firm*—Charles Jew

[57] ABSTRACT

This invention is directed to solid electrolytes containing a solvent and, in particular, a solvent containing an oxyalkylene group and another functional group such as a carbonate, urethane or (di)thiocarbonate. The invention is also directed to the use of solid matrix forming prepolymers which include an oxyalkylene group and another functional group such as a carbonate, urethane or thio carbonate. The electrolytes are useful in electrolytic cells.

16 Claims, No Drawings

SOLID ELECTROLYTES, CONTAINING OXYALKYLENE SOLVENTS AND/OR OXYALKLENE POLYMERS AND ELECTROLYTIC CELLS PRODUCED THEREFROM

This is a continuation of application Ser. No. 08/136,437, filed Oct. 13, 1993 now abandoned.

BACKGROUND OF THE INVENTION

1. Field of the Invention

This invention is directed to solid electrolytes containing a polymer matrix and an electrolyte solvent (plasticizer) for the polymer matrix. In particular, this invention is directed to solid electrolytes which include an inorganic ion salt, an oxyalkylene-containing solvent, and/or oxyalkylene-containing repeating units in the polymer matrix.

This invention is further directed to solid electrolytic cells (batteries) containing an anode, a cathode and a solid electrolyte containing a polymer matrix which includes an inorganic ion salt, an oxyalkylene-containing solvent and/or oxyalkylene-containing repeating units in the polymer matrix.

2. State of the Art

Electrolytic cells containing an anode, a cathode and a solid, solvent-containing electrolyte incorporating an inorganic ion salt are known in the art and are usually referred to as "solid batteries". These cells offer a number of advantages over electrolytic cells containing a liquid electrolyte (i.e., "liquid batteries") including improved safety features.

Specifically, solid batteries employ a solid electrolyte interposed between a cathode and an anode. The solid electrolyte contains either an inorganic or an organic matrix and a suitable inorganic ion salt as a separate component. The inorganic matrix may be non-polymeric [e.g., β-alumina, silver oxide, lithium iodide, etc.] or polymeric [e.g., inorganic (polyphosphazene) polymers] whereas the organic matrix is typically polymeric. Suitable organic polymeric matrices are well known in the art and are typically organic polymers obtained by polymerization of a suitable organic monomer as described, for example, in U.S. Pat. No. 4,908,283. Suitable organic monomers include, by way of example, ethylene oxide, propylene oxide, ethyleneimine, epichlorohydrin, ethylene succinate, and an acryloyl-derivatized alkylene oxide containing an acryloyl group of the formula $CH_2=CR'C(O)O-$ where R' is hydrogen or lower alkyl of from 1–6 carbon atoms. Reference is made to Fiona M. Gray, "Solid Polymer Electrolytes", VCH Publishers, Inc., New York, N.Y., 1991, the disclosure of which is incorporated herein in its entirety.

Because of their expense and difficulty in forming into a variety of shapes, inorganic non-polymeric matrices are generally not preferred and the art typically employs a solid electrolyte containing a polymeric matrix. Nevertheless, electrolytic cells containing a solid electrolyte containing a polymeric matrix suffer from low ion conductivity and, accordingly, in order to maximize the conductivity of these materials, the matrix is generally constructed into a very thin film, i.e., on the order of about 25 to about 250 µm. As is apparent, the reduced thickness of the film reduces the total amount of internal resistance within the electrolyte thereby minimizing losses in conductivity due to internal resistance.

The solid electrolytes also contain a solvent (plasticizer) which is added to the matrix primarily in order to enhance the solubility of the inorganic ion salt in the solid electrolyte and thereby increase the conductivity of the electrolytic cell. In this regard, the solvent requirements of the solvent used in the solid electrolyte have been art recognized to be different from the solvent requirements in liquid electrolytes. For example, solid electrolytes require a lower solvent volatility as compared to the solvent volatilities permitted in liquid electrolytes.

Suitable prior art solvents well known in the art for use in such solid electrolytes include, by way of example, propylene carbonate, ethylene carbonate, γ-butyrolactone, tetrahydrofuran, glyme (dimethoxyethane), diglyme, tetraglyme, dimethylsulfoxide, dioxolane, sulfolane and the like.

Heretofore, the solid, solvent-containing electrolyte has typically been formed by one of two methods. In one method, the solid matrix is first formed and then a requisite amount of this material is dissolved in a volatile solvent. Requisite amounts of the inorganic ion salt and the electrolyte solvent (usually a glyme and an organic carbonate) are then added to the solution. This solution is then placed on the surface of a suitable substrate (e.g., the surface of a cathode) and the volatile solvent is removed to provide for the solid electrolyte.

In the other method, a monomer or partial polymer of the polymeric matrix to be formed is combined with appropriate amounts of the inorganic ion salt and the solvent. This mixture is then placed on the surface of a suitable substrate (e.g., the surface of the cathode) and the monomer is polymerized or cured (or the partial polymer is then further polymerized or cured) by conventional techniques (heat, ultraviolet radiation, electron beams, etc.) so as to form the solid, solvent-containing electrolyte.

When the solid electrolyte is formed on a cathodic surface, an anodic material can then be laminated onto the solid electrolyte to form a solid battery (i.e., an electrolytic cell).

Regardless of which of the above techniques is used in preparing the solid electrolyte, an important concern is the ability of the electrolyte solvent to dissolve the inorganic ion salt. In the constant search for improved solubility, the art has turned to solvent mixtures, the most widely used being the above-mentioned organic carbonate/glyme. The combination of carbonate and ether functions provides adequate solvation of the inorganic ion salt at relatively high salt concentration levels.

However, the use of carbonate/glyme or other solvent mixtures adds to the cost of producing the electrolyte, due to the necessity of storing separate inventories of solvents, and the need for mixing equipment to obtain the proper ratio of the solvents.

SUMMARY OF THE INVENTION

The present invention is directed, in part, to the discovery that the use of a single solvent having multiple functional groups can partially or completely replace an electrolyte solvent mixture. In particular, the invention provides for eliminating the use of electrolyte solvent mixtures by using a single solvent containing oxyalkylene groups and at least one other group, for example a carbonate, urethane, thiocarbonate or dithiocarbonate group. The invention also provides for a polymer matrix which contains repeating units having oxyalkylene groups and at least one other group such as a carbonate, urethane, or (di)thiocarbonate. Incorporation of such repeating units into the polymer matrix increases the compatibility of the matrix and the inorganic ion salt, and also aids in ion transport.

3

Accordingly, in one of its composition aspects, this invention is directed to a solid, single-phase, solvent containing electrolyte which comprises:

a solid polymeric matrix;

an inorganic ion salt; and an electrolyte solvent comprising an oxyalkylene-containing compound having the formula:

$$AQ_i^1Q_j^2(Y^1R^1)_kB \qquad (I)$$

where A is hydrogen or an alkyl group having from 1 to 4 carbon atoms, B is selected from the group consisting of an alkoxy group having from 1 to 4 carbon atoms, $NR^2R^3$ where $R^2$ and $R^3$ are each hydrogen or an alkyl group having from 1 to 4 carbon atoms, and $SR^4$, where $R^4$ is an alkyl group having from 1 to 4 carbon atoms, where $R^1$ is an alkylene group having from 1 to 4 carbon atoms, $Q^1$ is a group of the formula:

$$-[Y^2R^5)_lY^3C(O)]- \qquad (II)$$

$Q^2$ is a group of the formula:

$$-[Y^4R^6)_mY^5C(O)]- \qquad (III)$$

where $R^5$ and $R^6$ are independently selected alkylene groups of from 1 to 4 carbon atoms, $Y^1$, $Y^2$, $Y^3$, $Y^4$, and $Y^5$ are independently selected from the group consisting of O, S and $NR^7$, where $R^7$ is an alkyl group of from 1 to 4 carbon atoms or hydrogen, i is an integer from 1 to 4, j is 0 or an integer from 1 to 4, k is 0 or an integer from 1 to 4, l is 0 or an integer from 1 to 4, and m is 0 or an integer from 1 to 4; with the proviso that at least one of the Y groups is oxygen.

In another of its composition aspects, the present invention is directed to an electrolytic cell which comprises:

an anode comprising a compatible anodic material;

a cathode comprising a compatible cathodic material; and interposed therebetween a single phase, solid solvent-containing electrolyte which comprises:

a solid polymeric matrix;

an inorganic ion salt; and an electrolytic solvent comprising an oxyalkylene-containing compound having the formula:

$$AQ_i^1Q_j^2(Y^1R^1)_kB \qquad (I)$$

where A, B, $Q^1$, $Q^2$, $Y^1$, $R^1$, i, j and k are as defined above.

In yet another of its compositional aspects, the invention is directed to a solid, single phase, solvent containing electrolyte which comprises a solid polymeric matrix;

an inorganic ion salt; and an electrolytic solvent;

wherein the solid polymeric matrix includes as repeating units an oxyalkylene-containing moiety having the formula:

$$Q_n^1Q_p^2(Y^1R^1)_k \qquad (IV)$$

where A, B, $Q^1$, $Q^2$, $Y^1$ and $R^1$ are as defined above, n is an integer from 1 to 15, p is 0 or an integer from 1 to 15 and k is 0 or an integer from 1 to 4.

In yet another of its composition aspects, the present invention is directed to an electrolytic cell which comprises:

an anode comprising a compatible anodic material;

a cathode comprising a compatible cathodic material; and

4 interposed therebetween a single phase, solid solvent-containing electrolyte which comprises:

a solid polymeric matrix;

an inorganic ion salt, and an electrolytic solvent;

wherein the solid polymeric matrix includes as repeating units an oxyalkylene-containing moiety having the formula:

$$Q_n^1Q_p^2(Y^1R^1)_k \qquad (IV)$$

where $Q^1$, $Q^2$, $Y^1$, $R^1$, n, p and k are as defined above.

DETAILED DESCRIPTION OF THE PREFERRED EMBODIMENTS

As noted above, this invention is directed to solid, solvent-containing electrolytes which employ a single solvent having multiple functionalities. The use of such a solvent eliminates the need for a solvent mixture. However, prior to describing this invention in further detail, the following terms will first be defined.

Definitions

As used herein, the following terms have the following meanings.

The term "solid polymeric matrix" refers to an electrolyte compatible material formed by polymerizing an inorganic or organic monomer (or partial polymer thereof) and which, when used in combination with the other components of the electrolyte, renders the electrolyte solid. The solid matrix may or may not be ion-conducting.

Suitable solid polymeric matrices are well known in the art and include solid matrices formed from inorganic polymers, organic polymers or a mixture of organic polymers with inorganic non- polymeric materials. Preferably, the solid polymeric matrix is an organic matrix derived from a solid matrix forming monomer and/or from partial polymers of a solid matrix forming monomer.

Alternatively, the solid polymeric matrix can be used in combination with a non-polymeric inorganic matrix. See, for example, U.S. Pat. No. 4,990,413, which is incorporated herein by reference in its entirety. Suitable non-polymeric inorganic materials for use in conjunction with the solid polymeric matrix include, by way of example, β-alumina, silver oxide, lithium iodide, and the like. Suitable inorganic monomers are also disclosed in U.S. Pat. Nos. 4,247,499; 4,388,385; 4,414,607; 4,394,280; 4,432,891; 4,539,276; and 4,557,985 each of which is incorporated herein by reference in its entirety.

The term "a solid matrix forming monomer" refers to inorganic or organic materials which in monomeric form can be polymerized, and in polymeric or oligormeric form can be further polymerized (i.e., cured or cross-linked) preferably in the presence of an inorganic ion salt and a solvent or solvent mixture to form solid matrices which are suitable for use as solid electrolytes in electrolytic cells. Other than the above-described monomer of the invention, suitable solid matrix forming monomers are well known in the art and the particular monomer employed is not critical. The solid matrix forming monomers have at least one heteroatom capable of forming donor acceptor bonds with inorganic cations (e.g., alkali ions). When polymerized, such compounds form an ionically conductive matrix.

Examples of suitable organic solid matrix forming monomers include, by way of example, propylene oxide, ethyleneimine, ethylene oxide, epichlorohydrin, acryloyl-derivatized polyalkylene oxides (as disclosed in U.S. Pat. No.

4,908,283), vinyl sulfonate polyalkylene oxides (as disclosed in U.S. Pat. application Ser. No. 07/918,438, filed Jul. 22, 1992, and entitled "SOLID ELECTROLYTES DERIVED BY POLYMERIZATION OF VINYL SULFONATE POLYALKYLENE OXIDES" now U.S. Pat. No. 5,262,253 which application is incorporated herein by reference in its entirety), and the like as well as mixtures thereof. Ethylene oxide is especially preferred. When the electrolytic cell employs the solid matrix forming monomer of the invention, the matrix can be a homopolymer or a copolymer incorporating one or more known solid matrix forming monomers.

Examples of suitable inorganic solid matrix forming monomers include, by way of example, phosphazenes and siloxanes. Phosphazene monomers and the resulting polyphosphazene solid matrix are disclosed by Abraham et al., Proc. Int. Power Sources Symp., 34th, pp. 81–83 (1990) and by Abraham et al., J. Electrochemical Society, Vol. 138, No. 4, pp. 921–927 (1991).

The term "polymer precursor" or "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized in the presence of either the solvent of the invention or a mixture of an organic carbonate and a glyme compound and an ion salt derivative, to form solid polymeric moieties which are suitable for use a solid electrolytes in electrolytic cells.

The term "cured" or "cured product" refers to the treatment of the solid matrix forming monomer or partial polymer thereof under polymerization conditions (including cross-linking) so as to form a solid polymeric matrix. Suitable polymerization conditions are well known in the art and include by way of example, heating the monomer, irradiating the monomer with UV light, electron beams, etc. The resulting cured product preferably contains repeating units containing at least one heteroatom such as oxygen or nitrogen which is capable of forming donor acceptor bonds with inorganic cations (e.g., alkali ions). Examples of cured products suitable for use in this invention are set forth in U.S. Pat. Nos. 4,830,939 and 4,990,413 which are incorporated herein by reference in their entirety. In one embodiment of the invention, the polymer matrix includes repeating units containing oxyalkylene groups and another functional group such as a(n) carbonate, urethane or (di)thiocarbonate.

The solid matrix forming monomer or partial polymer can be cured or further cured prior to or after addition of the solvent. For example, a composition comprising requisite amounts of the solid matrix forming monomer, an inorganic ion salt and the solvent of the invention can be applied to a substrate and then cured. Alternatively, the solid matrix forming monomer can be first cured and then dissolved into a suitable volatile solvent. Requisite amounts of the inorganic ion salt and the solvent can then be added. The mixture is then placed on a substrate and removal of the volatile solvent results in formation of a solid electrolyte. In either case, the resulting solid electrolyte is a homogeneous, single phase product which is maintained upon curing, and does not readily separate upon cooling to temperatures below room temperature. Accordingly, the solid electrolyte of this invention does not include a separator as is typical of liquid electrolytes.

The term "inorganic ion salt" refers to any inorganic salt which is suitable for use in a solid electrolyte. Representative examples are alkali metal salts of less mobile anions of weak bases having a large anionic radius. Examples of such anions are $I^-$, $Br^-$, $SCN^-$, $ClO_4^-$, $BF_4^-$, $PF_6^-$, $AsF_6^-$, $CF_3COO^-$, $CF_3SO_3^-$, $N(SO_2CF_3)_2^-$, $C(SO_2CF_3)_3^-$, etc. Specific examples of suitable inorganic ion salts include $LiClO_4$, $LiI$, $LiSCN$, $LiBF_4$, $LiAsF_6$, $LiCF_3SO_3$, $LiPF_6$, $NaI$, $NaSCN$, $KI$, $Li[N(SO_2CF_3)_2]$, $Li[C(SO_2CF_3)_3]$, and the like. The inorganic ion salt preferably contains at least one atom of Li, Na, K or Mg.

The terms "carbonate" or "organic carbonate" refer to hydrocarbyl carbonate compounds which do not contain any hydroxyl groups. Such carbonate compounds can be used in an electrolyte solvent as either part of the oxyalkylene group containing solvent of the invention or as a separate solvent component in an electrolyte containing a solid polymer matrix which incorporates repeating unit of the solid matrix forming monomer of the invention.

Suitable cyclic aliphatic carbonates for use in this invention include 1,3-dioxolan-2-one (ethylene carbonate); 4-methyl-1,3-dioxolan-2-one (propylene carbonate); 4,5-dimethyl-1,3-dioxolan-2-one; 4-ethyl-1,3-dioxolan-2-one; 4,4-dimethyl-1,3-dioxolan-2-one; 4-methyl-5-ethyl-1,3-dioxolan-2-one; 4,5-diethyl-1,3-dioxolan-2-one; 4,4-diethyl-1,3-dioxolan-2-one; 1,3-dioxan-2-one; 4,4-dimethyl-1,3-dioxan-2-one; 5,5-dimethyl-1,3-dioxan-2-one; 5-methyl-1,3-dioxan-2-one; 4-methyl-1,3-dioxan-2-one; 5,5-di-ethyl-1,3-dioxan-2-one; 4,6-dimethyl-1,3-dioxan-2-one; 4,4,6-trimethyl-1,3-dioxan-2-one; and spiro[1,3-oxa-2-cyclohexanone-5',5',1',3'-oxa-2'-cyclohexanone].

Several of these cyclic aliphatic carbonates are commercially available such as propylene carbonate and ethylene carbonate. Alternatively, the cyclic aliphatic carbonates can be readily prepared by well known reactions. For example, reaction of phosgene with a suitable alkane-$\alpha,\beta$-diol (dihydroxy alkanes having hydroxyl substituents on adjacent carbon atoms) or an alkane-$\alpha,\gamma$-diol (dihydroxy alkanes having hydroxyl substituents on carbon atoms in a 1,3 relationship) yields a cyclic aliphatic carbonate for use within the scope of this invention. See, for instance, U.S. Pat. No. 4,115,206, which is incorporated herein by reference in its entirety.

The cyclic aliphatic carbonates may be prepared by transesterification of a suitable alkane-$\alpha,\beta$-diol or an alkane-$\alpha,\gamma$-diol with, e.g., diethyl carbonate under transesterification conditions. See, for instance, U.S. Pat. Nos. 4,384,115 and 4,423,205 which are incorporated herein by reference in their entirety.

Additional suitable cyclic aliphatic carbonates are disclosed in U.S. Pat. No. 4,747,850 which is also incorporated herein by reference in its entirety.

Linear aliphatic carbonates are represented by the formulae:

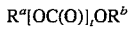

and

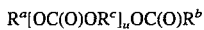

where each $R^a$ and $R^b$ are independently selected from the group consisting of alkyl of from 1 to 4 carbon atoms; $R^c$ is an alkylene group of from 2 to 4 carbon atoms; t is an integer of 1 or 2, and u is an integer from 1 to 4.

Linear aliphatic carbonates are well known in the art and a variety are commercially available. Additionally, the linear aliphatic carbonates can be prepared by transesterification of a suitable alcohol (e.g., $R^aOH$ or $R^bOH$) with, e.g., diethyl carbonate under transesterification conditions.

The term "glyme" refers to ethylene glycol dimethyl ether or $CH_3OCH_2CH_2OCH_3$. The term "a glyme" refers to glyme and also to diglyme, triglyme, tetraglyme, etc., which contain repeating units of $(OCH_2CH_2)$.

The term "(di)thiocarbonate" refers to compounds formed by reaction of mono- or dithiols with mono- or bischloroformates. Thiocarbonates are illustrated by the following reactions.

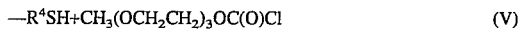

$$-R^4SH+CH_3(OCH_2CH_2)_3OC(O)Cl \quad (V)$$

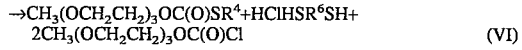

$$\rightarrow CH_3(OCH_2CH_2)_3OC(O)SR^4+HClHSR^6SH+ \\ 2CH_3(OCH_2CH_2)_3OC(O)Cl \quad (VI)$$

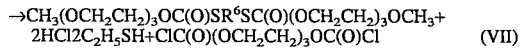

$$\rightarrow CH_3(OCH_2CH_2)_3OC(O)SR^6SC(O)(OCH_2CH_2)_3OCH_3+ \\ 2HCl2C_2H_5SH+ClC(O)(OCH_2CH_2)_3OC(O)Cl \quad (VII)$$

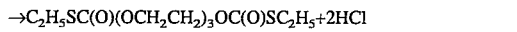

$$\rightarrow C_2H_5SC(O)(OCH_2CH_2)_3OC(O)SC_2H_5+2HCl$$

Referring to formulas I, II, and III, in reaction V A is $CH_3$, $Q^1$ is $(OCH_2CH_2)_3OC(O)$, i is 1, j and k are 0, l is 3, $Y^2$ and $Y^3$ are oxygen, $R^5$ is $CH_2CH_2$, and B is $SR^4$;

in reaction VI A and $Q^1$ are as before, $Q^2$ is $SR^6SC(O)$, $Y^4$ and $Y^5$ are sulfur, i, j, and m are 1, k and l are 3, $Y^1$, $Y^2$ and $Y^3$ are oxygen, $R^1$ is $CH_2CH_2$, and B is $OCH_3$; and in reaction VII A is $C_2H_5$, B is $SC_2H_5$, $Q^1$ is $SC(O)$, wherein l is 0 and $Y^3$ is S, $Q^2$ is $(OCH_2CH_2)_3OC(O)$, wherein $R^6$ is $CH_2CH_2$, $Y^4$ and $Y^5$ are oxygen and m is 3.

Particularly preferred are the oxyalkylene-containing compounds:

1. $CH_3(OCH_2CH_2)_3OC(O)(OCH_2CH_2)_3OCH_3$,
2. $CH_3(OCH_2CH_2)_3OC(O)SCH_2CH_2SC(O)(OCH_2CH_2)_3OCH_3$,
3. $CH_3(OCH_2CH_2)_3OC(O)SCH_3$ and
4. $CH_3(OCH_2CH_2)_3OC(O)SCH_2CH_2SC(O)SCH_3$.

The term "urethane" refers to compounds formed by reaction of a mono- or diamine with a mono- or bischloroformate. The urethanes of the invention are illustrated by the following reactions.

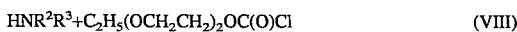

$$HNR^2R^3+C_2H_5(OCH_2CH_2)_2OC(O)Cl \quad (VIII)$$

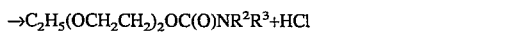

$$\rightarrow C_2H_5(OCH_2CH_2)_2OC(O)NR^2R^3+HCl$$

$$H_2NR^6NHR^7 + 2C_2H_5(OCH_2CH_2)_2OC(O)Cl \longrightarrow \quad (IX)$$

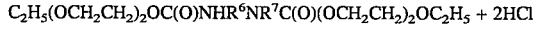

$$C_2H_5(OCH_2CH_2)_2OC(O)NHR^6NR^7C(O)(OCH_2CH_2)_2OC_2H_5 + 2HCl$$

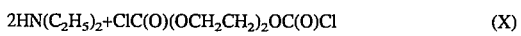

$$2HN(C_2H_5)_2+ClC(O)(OCH_2CH_2)_2OC(O)Cl \quad (X)$$

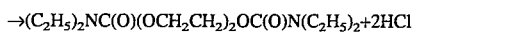

$$\rightarrow (C_2H_5)_2NC(O)(OCH_2CH_2)_2OC(O)N(C_2H_5)_2+2HCl$$

Referring to formulas I, II, and III, in reaction VIII A is $C_2H_5$, i is 1, j and k are 0, l is 2, $Q^1$ is $(OCH_2CH_2)_2OC(O)$, $Y^2$ and $Y^3$ are oxygen, $R^5$ is $CH_2CH_2$, and B is $NR^2R^3$;

in reaction IX A and $Q^1$ are as before, $Q^2$ is $NHR^6NR^7C(O)$, $Y^4$ is NH, $Y^5$ is $NR^7$, i, j, and m are 1, k and l are 2, $Y^1$, $Y^2$ and $Y^3$ are oxygen, $R^1$ is $CH_2CH_2$, and B is $OC_2H_5$; and in reaction X A is $C_2H_5$, $Q^1$ is $C_2H_5NC(O)$, wherein l is 0 and $Y^3$ is $C_2H_5N$, $Q^2$ is $(OCH_2CH_2)_2OC(O)$, wherein $R^6$ is $CH_2CH_2$, $Y^4$ and $Y^5$ are oxygen and m is 2, and B is $N(C_2H_5)_2$.

Urethanes are generally made by the reaction of an alcohol or diol with an isocyanate or a diisocyanate.

Particularly preferred solvents are:
1. $CH_3(OCH_2CH_2)_3OC(O)N(CH_3)_2$ and
2. $A(OCH_2CH_2)_1C(O)R^7NCH_2CH_2NR^7C(O)(OCH_2CH_2)_kB$ wherein A, B, $R^7$, l and k have been defined.

The term "electrolytic cell" or "electrochemical cell" refers to a composite containing an anode, a cathode and an ion-conducting electrolyte interposed therebetween.

The anode is typically comprised of a compatible anodic material which is any material which functions as an anode in a solid electrolytic cell. Such compatible anodic materials are well known in the art and include, by way of example, lithium, lithium alloys such as alloys of lithium with aluminum, mercury, tin, zinc, and the like, and intercalation based anodes such as carbon, tungsten oxides and the like.

The cathode is typically comprised of a compatible cathodic material (i.e., insertion compounds) which is any material which functions as a positive pole in a solid electrolytic cell. Such compatible cathodic materials are well known in the art and include, by way of example, manganese oxides, molybdenum oxides, vanadium oxides, sulfides of titanium and niobium, lithiated cobalt oxides, lithiated nickel oxides, the various lithiated manganese oxides, chromium oxides, copper oxides, and the like. The particular compatible cathodic material employed is not critical.

In one preferred embodiment, the compatible cathodic material is mixed with an electroconductive material including, by way of example, graphite, powdered carbon, powdered nickel, metal particles, electronically conductive polymers (i.e., characterized by a conjugated network of double bonds like polypyrrole, polyacetylene, polyaniline and polythiophene and the like), and a binder, such as a polymeric binder, to form under pressure a positive cathodic plate.

In another preferred embodiment, the cathode is prepared from a cathode paste which comprises from about 35 to 70 weight percent of a compatible cathodic material; from about 1 to 20 weight percent of an electroconductive agent; from about 0 to 20 weight percent of polyethylene oxide having a number average molecular weight of at least 100,000; from about 10 to 50 weight percent of solvent comprising triglyme carbonate (as defined hereinafter); and from about 5 weight percent to about 25 weight percent of a solid matrix forming monomer or partial polymer thereof.

The cathode paste is typically spread onto a suitable support such as a current collector and then cured by conventional methods to provide for a solid positive cathodic plate. The cathode (excluding the support) generally has a thickness of about 20 to about 150 microns.

Current collectors are well known in the art some of which are commercially available. One particularly preferred current collector for the cathode is a roughened nickel (electrolytically deposited nickel) on nickel current collector (available as CF18/NiT from Fukuda Metal Foil & Powder Company, Ltd., Kyoto, Japan). Another preferred current collector employs a sheet of aluminum foil. The current collector is preferably attached to the surface of the cathode not facing the electrolyte but can also be attached to the anode. When the current collector is attached to the cathode, the cathode is interposed between the electrolyte and the current collector.

In still another preferred embodiment, the electrolyte solvent and the cathode solvent are identical.

Methodology

Methods for preparing solid, solvent-containing electrolytes are well known in the art. In one embodiment, however, this invention utilizes a particular solvent in the preparation of solid electrolytes which solvent provides improvements in electrolyte manufacture and economics.

The oxyalkylene-containing compounds of the invention can be prepared by reaction of a mono- or bischloroformate with an alcohol or diol, an amine or diamine, or a thio(mercaptan) or dithiol, or with an alkali metal salt of any of the above, with evolution of HCl or an alkali chloride as a by-product.

Control of molecular weight is important from the standpoint of use of the oxyalkylene-containing compound as a solvent. Generally, the number average molecular weight is less than 1200, desirably less than 1000 and preferably less than 700 when the oxyalkylene-containing compound is used as a solvent.

When the oxyalkylene-containing compound is used as a solid matrix forming polymer precursor in the solid polymeric matrix, the molecular weight of the prepolymer can be similar to that used for the solvent. Alternatively, the molecular weight of the prepolymer can be greater than 1200, for example, from about 1200 to about 100,000.

The molecular weight, MW, can be easily controlled by reaction conditions, including the order of addition of starting materials, the rate of addition, solution concentration, etc. One skilled in the art can readily control the conditions of the particular condensation reaction to obtain the desired product and molecular weight.

When using bischloroformates as a starting material it is also possible to form cyclic compounds which are useful in the invention. The cyclic compounds are formed by reacting a bischloroformate with a dialcohol. Such cyclic compounds comprise rings having at least 10 members. One skilled in the art can readily select the appropriate bischloroformate and dialcohol to form the cylcic compounds.

The mono and bischloroformates are prepared from dihydroxy compounds by reaction with phosgene (carbonyl chloride).

The solid, solvent-containing electrolyte is preferably prepared by combining one or more solid matrix-forming prepolymers, the inorganic ion salt, and the solvent. The resulting composition is then uniformly coated onto a suitable substrate (e.g., aluminum foil, a glass plate, a lithium anode, a cathode, etc.) by means of a roller, a doctor blade, a bar coater, a silk screen or spinner to obtain a film of this composition or its solution. In some cases, it may be necessary to heat the composition so as to provide for a coatable material.

Preferably, the amount of material coated onto the substrate is an amount sufficient so that after curing, the resulting solid, solvent-containing electrolyte has a thickness of no more than about 250 microns ($\mu$m). Preferably, the solid, solvent-containing electrolyte may have a thickness of from about 20 to about 250 microns. The final thickness will depend on the particular application.

The electrolyte composition typically comprises from about 5 to about 25 weight percent of the inorganic ion salt based on the total weight of the electrolyte; preferably, from about 10 to 20 weight percent.

The electrolyte composition typically comprises from about 40 to about 80 weight percent solvent based on the total weight of the electrolyte, preferably from about 60 to about 80 weight percent, and even more preferably about 70 weight percent.

The solid electrolyte composition typically comprises from about 5 to about 30 weight percent of the solid polymeric matrix based on the total weight of the electrolyte, preferably from about 15 to about 25 weight percent.

In a preferred embodiment, the electrolyte composition further comprises a small amount of a film forming agent.

Suitable film forming agents are well known in the art and include, by way of example, polyethylene oxide, polypropylene oxide, copolymers thereof, and the like, having a numbered average molecular weight of at least about 100,000. Preferably, the film forming agent is employed in an amount of about 1 to about 10 weight percent and more preferably at about 2.5 weight percent based on the total weight of the electrolyte composition.

The composition is cured by conventional methods to form a solid film. For example, when the solid matrix forming prepolymer contains a reactive double bond, suitable curing methods include heating, irradiation with UV radiation, irradiation with electron beams (EB), etc. When the composition is cured by heating or UV radiation, the composition preferably contains an initiator. For example, when curing is by heating, the initiator is typically a peroxide such as benzoyl peroxide, methyl ethyl ketone peroxide, t-butyl peroxypyvarate, diisopropyl peroxycarbonate, and the like. When curing is by UV radiation, the initiator is typically benzophenone, Darocur 1173 (Geigy, Ardsley, N.Y.), and the like.

The initiator is generally employed in an amount sufficient to initiate the polymerization reaction. Preferably, the initiator is employed at up to about 1 weight percent based on the weight of the solid matrix forming monomer.

When curing is by EB treatment, an initiator is not required.

The resulting solid electrolyte is a homogeneous, single phase material which is maintained upon curing, and does not readily separate upon cooling to temperatures below room temperature. See, for example, U.S. Pat. No. 4,925,751 which is incorporated herein by reference in its entirety.

Additionally, it is desirable to avoid the use of any protic materials which will be incorporated into the battery. For example, most of the protic inhibitors in mono-, di-, tri- and higher functional acrylate monomers as well as in the urethane acrylate prepolymers, are preferably removed prior to formation of the cathode and/or electrolyte. In this regard, removal of these inhibitors down to a level of less than 50 parts per million (ppm) can be accomplished by contacting these monomers and prepolymers with an inhibitor remover. Suitable inhibitor removers are commercially available.

In a preferred embodiment, the process of forming an electrolytic cell comprises the steps of coating the surface of a cathode with a composition comprising at least one solid matrix forming polymer precursor, an inorganic ion salt and the solvent. The composition is then cured to provide for a solid electrolyte on the cathodic surface. The anode (e.g., a lithium foil) is then laminated to this composite product in such a way that the solid electrolyte is interposed between the lithium foil and the cathodic material.

This process can be reversed, so that the surface of the anode is coated with a composition comprising a solid matrix forming monomer, the solvent and an inorganic ion salt. The composition is then cured to provide for a solid electrolyte on the anodic surface. The cathode is then laminated to this composite product in such a way that the solid electrolyte is interposed between the lithium foil and the cathodic material.

Methods for preparing solid electrolytes and electrolytic cells are also set forth in U.S. Pat. Nos. 4,830,939 and 4,925,751 which are incorporated herein by reference in their entirety.

Utility

The solid, solvent-containing electrolytes described herein are particularly useful in preparing solid electrolytic cells in which a single solvent having multiple functionalities is employed.

The following examples are offered to illustrate the methodology of the present invention and should not be construed in any way as limiting its scope.

EXAMPLE 1

A. The Cathode

The cathode may be prepared from a cathodic paste which, in turn, is prepared from a cathode powder as follows:

i. Cathode Powder

The cathode powder is prepared by combining 90.44 weight percent $V_6O_3$ [prepared by heating ammonium metavanadate ($NH_4^+VO_3^-$) at 450° C. for 16 hours under N2 flow] and 9.56 weight percent of carbon (from Chevron Chemical Company, San Ramon, Calif. under the trade name of Shawinigan Black®). About 100 grams of the resulting mixture is placed into a grinding machine (Attritor Model S-1 purchased from Union Process, Akron, Ohio) and ground for 45 minutes. Afterwards, the resulting mixture is dried at about 260° C. for 16 hours under vacuum to provide a cathode powder having about 84.45 weight percent $V_6O_{13}$.

The above mixing procedure is repeated to provide for a total of 292 grams of cathode powder.

ii. Cathode Paste

A cathode paste may be prepared by combining sufficient cathode powder to provide for a final product having 45 weight percent $V_6O_{13}$.

Specifically, about 26.2 grams of unground carbon (from Chevron Chemical Company, San Ramon, Calif. under the trade name of Shawinigan Black®) is combined in a glove box [under dry (<10 ppm $H_2O$) argon at ambient temperature and pressure] with about 169.9 grams of triglyme carbonate and the resulting composite is mixed under dry argon and at ambient temperature and pressure on a double planetary mixer (Ross #2 mixer available from Charles Ross & Sons, Company, Hauppag, N.Y.) at about 25 rpms until a paste is formed.

About 225.0 grams of a cathode powder prepared in a manner similar to that described above is added to the mixer and the resulting composite is mixed under dry argon and at ambient temperature and pressure on a double planetary mixer at about 25 rpms until a dry paste is formed.

About 5 grams of polyethylene oxide (number average molecular weight about 600,000 available as Polyox WSR-205 from Union Carbide Chemicals and Plastics, Danbury, Conn.), about 42.5 grams of polyethylene glycol diacrylate (molecular weight about 400 available as SR-344 from Sartomer Company, Inc., Exton, Pa.) and containing less than about 50 ppm of inhibitor, and about 7.5 grams of ethoxylated trimethylpropane triacrylate (TMPEOTA) (molecular weight about 450 available as SR-454 from Sartomer Company, Inc., Exton, Pa.) and containing less than about 50 ppm of inhibitor are added to the triglyme carbonate as described above and this mixture then added to the mixer.

The resulting slurry in the mixer is heated at about 65° C. while mixing for 2 hours at 60 rpms to provide for the cathodic paste which would have the following approximate weight percent of components:

| | |
|---|---|
| $V_6O_{13}$ | 45.00 weight percent |
| Carbon | 10.00 weight percent |
| Triglyme carbonate | 33.98 weight percent |
| Polyethylene glycol diacrylate | 8.51 weight percent |
| Ethoxylated trimethylpropane triacrylate[1] | 1.51 weight percent |
| Polyethylene oxide | 1.00 weight percent |

[1] Inhibitor may be removed from both the polyethylene glycol diacrylate and ethoxylated trimethylpropane triacrylate by contacting each of these compounds with an Inhibitor Remover available as Product No. 31,133-2 from Aldrich Chemical, Milwaukee, Wisconsin, which results in less than 50 ppm of inhibitor in the product.

[1] Inhibitor may be removed from both the polyethylene glycol diacrylate and ethoxylated trimethylpropane triacrylate by contacting each of these compounds with an Inhibitor Remover available as Product No. 31,133-2 from Aldrich Chemical, Milwaukee, Wis., which results in less than 50 ppm of inhibitor in the product.

In an alternative embodiment, the requisite amounts of all of the cathodic materials other than the cathode powder can be combined to form a first mixture and this first mixture is combined with the cathode powder to form a second mixture. This second mixture is then thoroughly mixed to provide for the cathode paste.

The cathode paste prepared as above is placed onto a sheet (about 1 mil (≈25 µm) thick by 10 cm wide) of a roughened nickel on nickel current collector (available as CF18/NiT from Fukuda Metal Foil & Powder Company, Ltd., Kyoto, Japan). A Mylar cover sheet is then placed over the paste and the paste is spread to a thickness of about 75 microns (µm) with a conventional plate and roller system and cured by continuously passing the sheet through an electron beam apparatus (Electrocurtain, Energy Science Inc., Woburn, Mass.) at a voltage of about 175 kV and a current of about 12 mA and at a conveyor belt speed setting of 50 which provides a conveyor speed of about 3 in/sec. After curing, the Mylar sheet is removed to provide for a solid cathode laminated to a nickel on nickel current collector.

B. Electrolyte

The electrolyte may be prepared by first combining 70.64 grams of triglyme carbonate, and 17.56 grams of urethane acrylate (available as Photomer 6140 from Harcros, Manchester, U.K. ) The triglyme carbonate/urethane acrylate mixture is dried over molecular sieves (Grade 514, 4 Å, 8–12 mesh, available from W. R. Grace, Baltimore, Md.) to remove water.

This solution is then combined with 2.56 grams of polyethylene oxide (weight average molecular weight about 600,000 available as Polyox WSR-205 from Union Carbide Chemicals and Plastics, Danbury, Conn.). The mixture is then thoroughly mixed with the same laboratory mixer at heating until a temperature of about 65° C. is reached and then cooled to ambient temperature over at least a 2 hour period while stirring is maintained.

Once the polyethylene oxide is dispersed and dissolved, 9.24 grams of $LiPF_6$ (available from Hashimoto Chemical Corp., Osaka, Japan) are added while stirring with a laboratory mixer (Yamam Model LR41B, available from Fisher Scientific, Santa Clara, Calif.).

The resulting 100 gram mixture would contain the following weight percent of components:

| | |
|---|---|
| Triglyme carbonate | 70.64 weight percent |
| Urethane acrylate (Photomer 6140) | 17.56 weight percent |
| $LiPF_6$ | 9.24 weight percent |
| Polyethylene oxide | 2.56 weight percent. |

Afterwards, the electrolyte mixture is then coated by a conventional knife blade to a thickness of about 50 µm onto the surface of the cathode sheet prepared as above (on the side opposite that of the current collector) but without the Mylar covering. The electrolyte is then cured by continuously passing the sheet through an electron beam apparatus (Electrocurtain, Energy Science Inc., Woburn, Mass.) at a voltage of about 175 kV and a current of about 1.0 mA and at a conveyor speed setting of 50 which provides for a conveyor speed of about 1 cm/sec. After curing, a composite is recovered which contains a solid electrolyte laminated to a solid cathode which, in turn, is laminated to a nickel on nickel current collector.

C. Anode

The anode may comprise a sheet of lithium foil (51 or 76 µm thick) which is commercially available from FMC Corporation Lithium Division, Bessemer City, N.C.

D. The Solid Battery

A solid battery may be prepared by first preparing a cathodic paste as described above which is spread onto a substrate (e.g., a current collector) and then cured to provide the cathode. An electrolyte composition as described above is then placed onto the cathode surface and cured to provide for the solid electrolyte. Then, the anode is laminated onto the solid electrolyte to provide for the solid battery.

EXAMPLE 2

A solid electrolytic cell is prepared by first preparing a cathodic paste which is spread onto a current collector and is then cured to provide for the cathode. An electrolyte solution is then placed onto the cathode surface and is cured to provide for the solid electrolyte composition. Then, the anode is laminated onto the solid electrolyte composition to provide for a solid electrolytic cell. The specifics of this construction are as follows:

A. The Current Collector

The current collector employed is a sheet of aluminum foil having a layer of adhesion promoter attached to the surface of the foil which will contact the cathode so as to form a composite having a sheet of aluminum foil, a cathode and a layer of adhesion promoter interposed therebetween.

Specifically, the adhesion promoter layer is prepared as a dispersed colloidal solution in one of two methods. The first preparation of this colloidal solution for this example is as follows:

| | |
|---|---|
| 84.4 | weight percent of carbon powder (Shawinigan Black ® -- available from Chevron Chemical Company, San Ramon, CA) |
| 337.6 | weight percent of a 25 weight percent solution of polyacrylic acid (a reported average molecular weight of about 90,000, commercially available from Aldrich Chemical Company -- contains about 84.4 grams polyacrylic acid and 253.2 grams water) |
| 578.0 | weight percent of isopropanol |

The carbon powder and isopropanol are combined with mixing in a conventional high shear colloid mill mixer (Ebenbach-type colloid mill) until the carbon is uniformly dispersed and the carbon particle size is smaller than 10 microns. At this point, the 25 weight percent solution of polyacrylic acid is added to the solution and mixed for approximately 15 minutes. The resulting mixture is pumped to the coating head and roll coated with a Meyer rod onto a sheet of aluminum foil (about 9 inches wide and about 0.0005 inches thick). After application, the solution/foil are contacted with a Mylar wipe (about 0.002 inches thick by about 2 inches and by about 9 inches wide—the entire width of aluminum foil). The wipe is flexibly engaged with the foil (i.e., the wipe merely contacts the foil) to redistribute the solution so as to provide for a substantially uniform coating. Evaporation of the solvents (i.e., water and isopropanol) via a conventional gas-fired oven provides for an electrically-conducting adhesion-promoter layer of about 6 microns in thickness or about $3\times10^{-4}$ grams per cm$^2$. The aluminum foil is then cut to about 8 inches wide by removing approximately ½, inch from either side by the use of a conventional slitter so as to remove any uneven edges.

In order to further remove the protic solvent from this layer, the foil is redried. In particular, the foil is wound up and a copper support placed through the roll's cavity. The roll is then hung overnight from the support in a vacuum oven maintained at about 130° C. Afterwards, the roll is removed. In order to avoid absorption of moisture from the atmosphere, the roll is preferably stored into a desiccator or other similar anhydrous environment to minimize atmospheric moisture content until the cathode paste is ready for application onto this roll.

The second preparation of this colloidal solution comprises mixing 25 lbs of carbon powder (Shawinigan Black®—available from Chevron Chemical Company, San Ramon, Calif.) with 100 lbs of a 25 weight percent solution of polyacrylic acid (average molecular weight of about 240,000, commercially available from BF Goodrich, Cleveland, Ohio, as Good-Rite K702—contains about 25 lbs polyacrylic acid and 75 lbs water) and with 18.5 lbs of isopropanol. Stirring is done in a 30 gallon polyethylene drum with a gear-motor mixer (e.g., Lightin Labmaster Mixer, model XJ-43, available from Cole-Parmer Instruments Co., Niles, Ill.) at 720 rpm with two 5 inch diameter A310-type propellers mounted on a single shaft. This wets down the carbon and eliminates any further dust problem. The resulting weight of the mixture is 143.5 lbs and contains some "lumps".

The mixture is then further mixed with an ink mill which consists of three steel rollers almost in contact with each other, turning at 275,300, and 325 rpms respectively. This high shear operation allows particles that are sufficiently small to pass directly through the rollers. Those that do not pass through the rollers continue to mix in the ink mill until they are small enough to pass through these rollers. When the mixing is complete, the carbon powder is completely dispersed. A Hegman fineness of grind gauge (available from Paul N. Gardner Co., Pompano Beach, Fla.) indicates that the particles are 4–6 μm with the occasional 12.5 μm particles. The mixture can be stored for well over 1 month without the carbon settling out or reagglomerating.

When this composition is to be used to coat the current collector, an additional 55.5 lbs of isopropanol is mixed into the composition working with 5 gallon batches in a plastic pail using an air powered shaft mixer (Dayton model 42231 available from Granger Supply Co., San Jose, Calif.) with a 4 inch diameter Jiffy-Mixer brand impeller (such as an impeller available as Catalog No. G-04541-20 from Cole Parmer Instrument Co., Niles, Ill.). Then, it is gear pumped through a 25 μm cloth filter (e.g., So-Clean Filter Systems, American Felt and Filter Company, Newburgh, N.Y.) and Meyer-rod coated as described above.

B. The Cathode

The cathode is prepared from a cathodic paste which, in turn, is prepared from a cathode powder as follows:

i. Cathode Powder

The cathode powder is prepared by combining 90.44 weight percent $V_6O_{13}$ [prepared by heating ammonium metavanadate ($NH_4^+VO_3^-$) at 450° C. for 16 hours under $N_2$ flow] and 9.56 weight percent of carbon (from Chevron Chemical Company, San Ramon, Calif. under the tradename of Shawinigan Black®). About 100 grams of the resulting mixture is placed into a grinding machine (Attritor Model S-1 purchased from Union Process, Akron, Ohio) and ground for 30 minutes. Afterwards, the resulting mixture is dried at about 260° C. for 21 hours.

ii. Cathode Paste

A cathode paste is prepared by combining sufficient cathode powder to provide for a final product having 45 weight percent $V_6O_{13}$.

Specifically, 171.6 grams of triglyme carbonate is combined with 42.9 grams of polyethylene glycol diacrylate (molecular weight about 400 available as SR-344 from Sartomer Company, Inc., Exton, Pa.), and about 7.6 grams of ethoxylated trimethylpropane triacrylate (TMPEOTA)

(molecular weight about 450 available as SR-454 from Sartomer Company, Inc., Exton, Pa.) in a double planetary mixer (Ross #2 mixer available from Charles Ross & Sons, Company, Hauppag, N.Y.).

A propeller mixture is inserted into the double planetary mixer and the resulting mixture is stirred at a 150 rpms until homogeneous. The resulting solution is then passed through sodiated 4 Å molecular sieves. The solution is then returned to double planetary mixer equipped with the propeller mixer and about 5 grams of polyethylene oxide (number average molecular weight about 600,000 available as Polyox WSR-205 from Union Carbide Chemicals and Plastics, Danbury, Conn.) is added to the solution vortex from by the propeller by a mini-sieve such as a 25 mesh mini-sieve commercially available as Order No. 57333-965 from VWR Scientific, San Francisco, Calif.

The solution is then heated while stirring until the temperature of the solution reaches 65° C. At this point, stirring is continued until the solution is completely clear. The propeller blade is removed and the carbon powder prepared as above is then is added as well as an additional 28.71 grams of unground carbon (from Chevron Chemical Company, San Ramon, Calif. under the tradename of Shawinigan Black®). The resulting mixture is mixed at a rate of 7.5 cycles per second for 30 minutes in the double planetary mixer. During this mixing the temperature is slowly increased to a maximum of 73° C. At this point, the mixing is reduced to 1 cycle per second the mixture slowly cooled to 40° C. to 48° C. (e.g. about 45° C.). The resulting cathode paste is maintained at this temperature until just prior to application onto the current collector.

The resulting cathode paste has the following approximate weight percent of components:

| | |
|---|---|
| $V_6O_{13}$ | 45 weight percent |
| Carbon | 10 weight percent |
| Triglyme carbonate | 34 weight percent |
| Polyethylene oxide | 1 weight percent |
| Polyethylene glycol diacrylate | 8.5 weight percent |
| Ethoxylated trimethylpropane triacrylate | 1.5 weight percent. |

In an alternative embodiment, the requisite amounts of all of the solid components are added to directly to combined liquid components. In this regard, mixing speeds can be adjusted to account for the amount of the material mixed and size of vessel used to prepare the cathode paste. Such adjustments are well known to the skilled artisan.

In order to enhance the coatability of the carbon paste onto the current collector, it may be desirable to heat the paste to a temperature of from about 60° C. to about 130° C. and more preferably, from about 80° C. to about 90° C. and for a period of time of from about 0.1 to about 2 hours, more preferably, from about 0.1 to 1 hour and even more preferably from about 0.2 to 1 hour. A particularly preferred combination is to heat the paste at from about 80° C. to about 90° C. for about 0.33 to about 0.5 hours.

During this heating step, there is no need to stir or mix the paste although such stirring or mixing may be conducted during this step. However, the only requirement is that the composition be heated during this period. In this regard, the composition to be heated has a volume to surface area ratio such that the entire mass is heated during the heating step.

A further description of this heating step is set forth in U.S. patent application Ser. No. 07/968,203 filed Oct. 29, 1992, entitled "METHODS FOR ENHANCING THE COATABILITY OF CARBON PASTES TO SUBSTRATES", now abandoned which application is incorporated herein by reference in its entirety.

The so-prepared cathode paste is then placed onto the adhesion layer of the current collector described above by extrusion at a temperature of from about 45° to about 48° C. A Mylar cover sheet is then placed over the paste and the paste is spread to thickness of about 90 microns (μm) with a conventional plate and roller system and is cured by continuously passing the sheet through an electron beam apparatus (Electrocurtain, Energy Science Inc., Woburn, Mass.) at a voltage of about 175 kV and a current of about 1.0 mA and at a rate of about 1 cm/sec. After curing, the Mylar sheet is removed to provide for a solid cathode laminated to the aluminum current collector described above.

C. Electrolyte 70.64 grams of triglyme carbonate, and 17.56 grams of urethane acrylate (Photomer 6140, available from Harcros, Manchester, U.K.) are combined at room temperature until homogeneous. The resulting solution is passed through a column of 4 Å sodiated molecular sieves to remove water and then mixed at room temperature until homogeneous.

At this point, 2.56 grams of polyethylene oxide film forming agent having a number average molecular weight of about 600,000 (available as Polyox WSR-205 from Union Carbide Chemicals and Plastics, Danbury, Conn.) is added to the solution and then dispersed while stirring with a magnetic stirrer over a period of about 120 minutes. After dispersion, the solution is heated to between 60° C. and 65° C. with stirring until the film forming agent dissolved. The solution is cooled to a temperature of between 45° and 48° C., a thermocouple is placed at the edge of the vortex created by the magnetic stirrer to monitor solution temperature, and then 9.24 grams of $LiPF_6$ are added to the solution over a 120 minute period while thoroughly mixing to ensure a substantially uniform temperature profile throughout the solution. Cooling is applied as necessary to maintain the temperature of the solution between 45° and 48° C.

In one embodiment, the polyethylene oxide film forming agent is added to the solution via a mini-sieve such as a 25 mesh mini-sieve commercially available as Order No. 57333-965 from VWR Scientific, San Francisco, Calif.

The resulting solution contains the following:

| Component | Amount | Weight Percent[2] |
|---|---|---|
| Triglyme carbonate | 70.64 g | 70.64 |
| Urethane acrylate | 17.56 g | 17.56 |
| $LiPF_6$ | 9.24 g | 9.24 |
| PEO film forming agent | 2.56 g | 2.56 |
| Total | 100 g | 100 |

[2]= weight percent based on the total weight of the electrolyte solution (100 g)

This solution is then degassed to provide for an electrolyte solution wherein little, if any, of the $LiPF_6$ salt decomposes.

Optionally, solutions produced as above and which contain the prepolymer, the polyalkylene oxide film forming agent, the electrolyte solvent and the $LiPF_6$ salt are filtered to remove any solid particles or gels remaining in the solution. One suitable filter device is a sintered stainless steel screen having a pore size between 1 and 50 μm at 100% efficiency.

Alternatively, the electrolyte solution can be prepared in the following manner. Specifically, in this example, the mixing procedure is conducted using the following weight percent of components:

| | |
|---|---|
| Triglyme carbonate | 65.571 weight percent |
| Urethane acrylate[3] | 20.379 weight percent |
| LiPF$_6$ | 10.720 weight percent |
| PEO film forming agent[4] | 3.340 weight percent |

[3](Photomer 6140, available from Henkel Corp., Coating and Chemical Division, Ambler, PA)
[4]Polyethylene oxide film forming agent having a number average molecular weight of about 600,000 (available as Polyox WSR-205 from Union Carbide Chemicals and Plastics, Danbury, CT)

The mixing procedure employs the following steps:

1. Check the moisture level of the urethane acrylate. If the moisture level is less than 100 ppm water, proceed to step 2. If not, then first dissolve the urethane acrylate at room temperature, <30° C., in the triglyme carbonate and dry the solution over sodiated 4 Å molecular sieves (Grade 514, 8–12 Mesh from Schoofs Inc., Moraga, Calif. and proceeds to step 4).

2. Dry the triglyme carbonate over sodiated 4 Å molecular sieves (Grade 514, 8–12 Mesh from Schoofs Inc., Moraga, Calif.).

3. At room temperature, <30° C., add the urethane acrylate to the solvent prepared in step 2. Stir at 300 rpm until the resin is completely dissolved. The solution should be clear and colorless.

4. Dry and then sift the polyethylene oxide film forming agent through a 25 mesh mini-sieve commercially available as Order No. 57333-965 from VWR Scientific, San Francisco, Calif. While stirring at 300 rpm, add the dried and presifted polyethylene oxide film forming agent slowing to the solution. The polyethylene oxide film forming agent should be sifted into the center of the vortex formed by the stirring means over a 30 minute period. Addition of the polyethylene oxide film forming agent should be dispersive and, during addition, the temperature should be maintained at room temperature (<30° C.).

5. After final addition of the polyethylene oxide film forming agent, stir an additional 30 minutes to ensure that the film forming agent is substantially dispersed.

6. Heat the mixture to 68° C. to 75° C. and stir until the film forming agent has melted and the solution has become transparent to light yellow in color. Optionally, in this step, the mixture is heated to 65° C. to 68° C.

7. Cool the solution produced in step 6 and when the temperature of the solution reaches 40° C., add the LiPF$_6$ salt very slowly making sure that the maximum temperature does not exceed 55° C.

8. After the final addition of the LiPF$_6$ salt, stir for an additional 30 minutes, degas, and let sit overnight and cool.

9. Filter the solution through a sintered stainless steel screen having a pore size between 1 and 50 μm at 100% efficiency.

At all times, the temperature of the solution should be monitored with a thermocouple which should be placed in the vortex formed by the mixer.

Afterwards, the electrolyte mixture is then coated by a conventional knife blade to a thickness of about 50 μm onto the surface of the cathode sheet prepared as above (on the side opposite that of the current collector) but without the Mylar covering. The electrolyte is then cured by continuously passing the sheet through an electron beam apparatus (Electrocurtain, Energy Science Inc., Woburn, Mass.) at a voltage of about 175 kV and a current of about 1.0 mA and at a conveyor speed setting of 50 which provides for a conveyor speed of about 1 cm/sec. After curing, a composite is recovered which contained a solid electrolyte laminated to a solid cathode.

D. Anode

The anode comprises a sheet of lithium foil (about 76 μm thick) which is commercially available from FMC Corporation Lithium Division, Bessemer City, N.C.

E. The Solid Electrolytic Cell

A sheet comprising a solid battery is prepared by laminating the lithium foil anode to the surface of the electrolyte in the sheet produced in step C above. Lamination is accomplished by minimal pressure.

While the invention has been described in terms of various preferred embodiments, the skilled artisan will appreciate the various modifications, substitutions, and omissions which may be made without departing from the spirit thereof. The descriptions of subject matter are illustrative of the invention and are not intended to be construed as limitations upon the scope of the invention.

What is claimed is:

1. A solid, solvent-containing electrolyte which comprises:

a solid polymeric matrix;

an inorganic ion salt; and an electrolytic solvent consisting essentially of an oxyalkylene-containing compound having the formula:

$$AQ_i^1 Q_j^2 (Y^1 R^1)_k B \quad \text{(I)}$$

where A is hydrogen or an alkyl group having from 1 to 4 carbon atoms, B is selected from the group consisting of an alkoxy group having from 1 to 4 carbon atoms, $NR^2R^3$ where $R^2$ and $R^3$ are each hydrogen or an alkyl group having from 1 to 4 carbon atoms, and $SR^4$, where $R^4$ is an alkyl group having from 1 to 4 carbon atoms, where $R^1$ is an alkylene group having from 1 to 4 carbon atoms, $Q^1$ is a group of the formula:

$$-[(Y^2R^5)_l Y^3 C(O)]- \quad \text{(II)}$$

$Q^2$ is a group of the formula:

$$-[(Y^4R^6)_m Y^5 C(O)]- \quad \text{(III)}$$

where $R^5$ and $R^6$ are independently selected alkylene groups of from 1 to 4 carbon atoms, $Y^1, Y^2, Y^3, Y^4$, and $Y^5$ are independently selected from the group consisting of O, S and $NR^7$, where $R^7$ is an alkyl group of from 1 to 4 carbon atoms or hydrogen, i is an integer from 1 to 4, j is 0 or an integer from 1 to 4, k is 0 or an integer from 1 to 4, l is 0 or an integer from 1 to 4, and m is 0 or an integer from 1 to 4; with the proviso that at least one but not all of the Y groups is oxygen.

2. A solvent-containing electrolyte according to claim 1, wherein said oxyalkylene-containing compound is:

$$CH_3(OCH_2CH_2)_3OC(O)SCH_3.$$

3. A solvent-containing electrolyte according to claim 1, wherein said oxyalkylene-containing compound is:

$$CH_3(OCH_3CH_3)_3OC(O)NCH_3CH_3.$$

4. A solvent-containing electrolyte according to claim 1, wherein said oxyalkylene-containing compound is:

$$CH_3(OCH_2CH_2)_3OC(O)SCH_2CH_2SC(O)SCH_3.$$

5. An electrolytic cell which comprises:

an anode comprising a compatible anodic material;

a cathode comprising a compatible cathodic material; and interposed therebetween a solid solvent-containing electrolyte which comprises:

a solid polymeric matrix;
an inorganic ion salt; and
an electrolytic solvent consisting essentially of an oxyalkylene-containing compound having the formula:

$$AQ_i^1 Q_j^2 (Y^1 R^1)_k B \quad (I)$$

where A is hydrogen or an alkyl group having from 1 to 4 carbon atoms, B is selected from the group consisting of an alkoxy group having from 1 to 4 carbon atoms, $NR^2R^3$ where $R^2$ and $R^3$ are each hydrogen or an alkyl group having from 1 to 4 carbon atoms, and $SR^4$, where $R^4$ is an alkyl group having from 1 to 4 carbon atoms, where $R^1$ is an alkylene group having from 1 to 4 carbon atoms, $Q^1$ is a group of the formula:

$$-[(Y^2R^5)_l Y^3 C(O)]- \quad (II)$$

$Q^2$ is a group of the formula:

$$-[(Y^4R^6)_m Y^5 C(O)]- \quad (III)$$

where $R^5$ and $R^6$ are independently selected alkylene groups of from 1 to 4 carbon atoms, $Y^1$, $Y^2$, $Y^3$, $Y^4$, and $Y^5$ are independently selected from the group consisting of O, S and $NR^7$, where $R^7$ is an alkyl group of from 1 to 4 carbon atoms or hydrogen, i is an integer from 1 to 4, j is 0 or an integer from 1 to 4, k is 0 or an integer from 1 to 4, l is 0 or an integer from 1 to 4, and m is 0 or an integer from 1 to 4; with the proviso that at least one but not all of the Y groups is oxygen.

6. An electrolytic cell according to claim 5, wherein said oxyalkylene-containing compound is $$CH_3(OCH_2CH_2)_3OC(O)SCH_2CH_2SC(O)(OCH_2CH_2)_3—OCH_3.$$

7. An electrolytic cell according to claim 5, wherein said oxyalkylene-containing compound is $$CH_3(OCH_2CH_2)_3OC(O)SCH_3.$$

8. An electrolytic cell according to claim 5, wherein said oxyalkylene-containing compound is $$CH_3(OCH_2CH_2)_3OC(O)NCH_3CH_3.$$

9. An electrolytic cell according to claim 5, wherein said oxyalkylene-containing compound is $$CH_3(OCH_2CH_2)_3OC(O)SCH_2CH_2SC(O)SCH_3.$$

10. A solid, solvent-containing electrolyte according to claim 1, wherein said polymeric matrix includes at least one solid matrix forming monomer selected from the group consisting of propylene oxide, ethyleneimine, ethylene oxide, epichlorohydrin, an acrylol-derivatized polyalkylene oxide, a vinyl sulfonate polyalkylene oxide and mixture thereof.

11. A solid solvent-containing electrolyte according to claim 10, wherein said polymeric matrix includes at least one solid matrix forming monomer selected from the group consisting of ethyleneimine, epichlorohydrin, and mixtures thereof.

12. An electrolytic cell according to claim 5, wherein said polymeric matrix includes at least one solid matrix forming monomer selected from the group consisting of propylene oxide, ethyleneimine, ethylene oxide, epichlorohydrin, an acrylol-derivatized polyalkylene oxide, a vinyl sulfonate polyalkylene oxide, and mixtures thereof.

13. An electrolytic cell according to claim 12, wherein said polymeric matrix includes at least one solid matrix forming monomer selected from the group consisting of ethyleneimine, epichlorohydrin, and mixtures thereof.

14. An electrolytic cell according to claim 5 wherein the anode is an intercalation based anode comprising carbon.

15. An electrolytic cell according to claim 14 wherein the cathode comprises cathodic materials selected from the group consisting of vanadium oxides, lithiated cobalt oxides, lithiated manganese oxides, and mixtures thereof.

16. An electrolytic cell according to claim 5 wherein the cathode comprises cathodic materials selected from the group consisting of vanadium oxides, lithiated cobalt oxides, lithiated manganese oxides, and mixtures thereof.

* * * * *